United States Patent
Sole et al.

(10) Patent No.: US 10,417,720 B2
(45) Date of Patent: Sep. 17, 2019

(54) METHOD FOR DISTRIBUTING ENERGY IN A HOME ENERGY MANAGEMENT SYSTEM

(71) Applicant: Dr. Ing. h.c. F. Porsche Aktiengesellschaft, Stuttgart (DE)

(72) Inventors: Barry Sole, Stuttgart (DE); Ralf Oestreicher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 60 days.

(21) Appl. No.: 15/636,020

(22) Filed: Jun. 28, 2017

(65) Prior Publication Data
US 2018/0012314 A1  Jan. 11, 2018

(30) Foreign Application Priority Data
Jul. 5, 2016 (DE) .................. 10 2016 112 249

(51) Int. Cl.
*G06Q 50/06* (2012.01)
*G05B 15/02* (2006.01)
(Continued)

(52) U.S. Cl.
CPC ............. *G06Q 50/06* (2013.01); *G05B 15/02* (2013.01); *H02J 3/14* (2013.01); *H02J 13/0006* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01)

(58) Field of Classification Search
CPC ........ G06Q 50/06; H02J 3/14; H02J 13/0006; H02J 2003/146; H02J 2003/143; G05B 15/02
(Continued)

(56) References Cited

U.S. PATENT DOCUMENTS 5,481,140 A * 1/1996 Maruyama ................ H02J 3/14
307/11
2008/0215263 A1 9/2008 Flohr
(Continued)

FOREIGN PATENT DOCUMENTS

DE 102011009355 A1 5/2012
KR 20110052981 A 5/2011
(Continued)

OTHER PUBLICATIONS

German Search Report, dated Jun. 20, 2017 of corresponding German Patent Application No. 10 2016 112 249.1, with partial English translation, 9 pages.
(Continued)

Primary Examiner — Robert E Fennema
Assistant Examiner — Jigneshkumar C Patel
(74) Attorney, Agent, or Firm — RatnerPrestia (57) ABSTRACT

A method for distributing energy in a home energy management system including a central unit, at least one energy source and at least one energy consumer that are interconnected to exchange information. According to the method, the central unit generates information containing a first price information element and a first energy quantity information element for a predefined time period; the central unit transfers the information to the energy consumer; the energy consumer, taking account of the information, determines requirement information containing at least one requested energy quantity for the predefined time period; the energy consumer transfers the requirement information to the central unit; the central unit checks whether, at any given time, the total requested energy quantity determined from the transferred requirement information exceeds the energy quantity available at this time; and the central unit transfers
(Continued)

confirmation information to the energy consumer or the method is carried out again.

8 Claims, 4 Drawing Sheets

(51) Int. Cl.
*H02J 13/00* (2006.01)
*H02J 3/14* (2006.01)

(58) Field of Classification Search
USPC .......................................................... 700/291
See application file for complete search history.

(56) References Cited

U.S. PATENT DOCUMENTS

| | | | | |
|---|---|---|---|---|
| 2010/0292856 | A1* | 11/2010 | Fujita | G06Q 10/04 |
| | | | | 700/291 |
| 2010/0298998 | A1* | 11/2010 | Hamilton, II | G06F 1/30 |
| | | | | 700/295 |
| 2012/0226572 | A1 | 9/2012 | Park et al. | |
| 2013/0204449 | A1 | 8/2013 | Ahn et al. | |
| 2013/0218356 | A1 | 8/2013 | Lee et al. | |
| 2014/0229027 | A1* | 8/2014 | Dhillon | G06Q 50/06 |
| | | | | 700/291 |
| 2015/0241896 | A1 | 8/2015 | Nishibayashi et al. | |

FOREIGN PATENT DOCUMENTS

| | | |
|---|---|---|
| KR | 20140052644 A | 5/2014 |
| WO | WO 2015/150211 A1 | 10/2015 |

OTHER PUBLICATIONS

Korean Office Action for Korean Application No. 10-2017-0085493, dated Jan. 24, 2018, 5 pages.

Indian Examination Report for Indian Application No. 201714018784, dated May 27, 2019, with translation, 6 pages.

* cited by examiner

METHOD FOR DISTRIBUTING ENERGY IN A HOME ENERGY MANAGEMENT SYSTEM

CROSS-REFERENCE TO RELATED APPLICATION

This application claims priority to German Patent Application No. DE 10 2016 112 249.1, filed Jul. 5, 2016, which is incorporated by reference herein in its entirety.

FIELD OF THE INVENTION

The present invention relates to a method for distributing energy in a home energy management system, comprising a central unit, an energy source and at least one energy consumer, wherein the central unit, the energy source and the energy consumer are interconnected to exchange information.

BACKGROUND OF THE INVENTION

Methods of this type for distributing energy and home energy management systems (HEMS) of this type are already known from the prior art. Renewable energies which make varying energy quantities available over time are subsidized on energy policy grounds. The energy quantities generated in this way are fed into the power grid, whereby the available energy is governed by prices that vary over time. Electric vehicles furthermore benefit from government subsidies in many countries on environmental policy grounds. The situation therefore arises wherein different energy quantities are offered at different prices over time and consumers in some instances require substantially differing energy quantities over time. Thus, for example, a charging electric vehicle requires large quantities of energy over a lengthy period, while a hairdryer requires only small amounts of energy and for only a short period of time, whereas a home air conditioning system for its part continuously requires slightly fluctuating energy quantities. Furthermore, some consumers themselves possess energy sources, for example photovoltaic systems, which can provide varying energy quantities over time.

It is therefore known that home energy management systems distribute the available energy quantities among energy consumers according to specific criteria. These known criteria include, inter alia, a strict prioritization; thus, for example, a home air conditioning system always takes priority over a charging electric vehicle. Alternatively, it is known to distribute the available energy quantities equally among all energy consumers. Finally, it is similarly known to distribute the available energy quantities according to the "first come, first served" principle, i.e. the first requesting energy consumer is allocated the entire required energy and the remaining available energy quantity is distributed among the other energy consumers in the order of the requests. These methods have many disadvantages.

It may thus occur, for example, that a consumer is reliant on mobility at specific times and therefore the charging of his electric vehicle benefits from a high priority at one specific time, but not at another time, or that a home air conditioning system can also be operated with a reduced energy requirement when temperatures are mild, but not when temperatures are significantly higher or lower. In each of these cases, a central unit, which can also be implemented through software, decides alone on the distribution of the available energy quantities with no possibilities of being influenced by the energy consumers, and normally without knowing why an energy consumer requests a specific quantity of energy at a specific time or for what purpose it requires this energy.

In order to standardize the data exchange in home energy management systems of this type, international standards and protocols have been devised, for example SEP 2.0, EEBus or ISO 15118. However, these standards and protocols have a limited field of application and regulate the energy distribution through central control with a specified distribution logic according to the criteria explained above, i.e. without information relating to the conditions of the connected energy consumers being transferred to the central unit.

SUMMARY OF THE INVENTION

Described herein is a method for distributing energy in a home energy management system, and also a home energy management system according to the aforementioned type with which a dynamic adaptation of the energy distribution to the different energy consumers can be achieved in a simple manner without the central unit requiring comprehensive information relating to the energy consumers, wherein, in particular, the energy consumers can adapt their energy consumption independently.

A method for distributing energy in a home energy management system, comprises a central unit, at least one energy source and at least one energy consumer, wherein the central unit, the energy source and the energy consumer are interconnected to exchange information, wherein, in a first step, the central unit generates information containing at least one first price information element and at least one first energy quantity information element for a specific time period, wherein, in a second step, the central unit transfers the information to the energy consumer, wherein, in a third step, the energy consumer, taking account of the information, determines requirement information containing at least one requested energy quantity for the predefined time period, wherein, in a fourth step, the energy consumer transfers the requirement information to the central unit, wherein, in a fifth step, the central unit checks whether, at any given time, the total requested energy quantity determined from the transferred requirement information exceeds the energy quantity available at this time, wherein in a sixth step:

(i) if the total requested energy quantity is less than or equal to the available energy quantity at each time, the central unit transfers confirmation information to the energy consumer, wherein the confirmation information contains information indicating that energy is available to the energy consumer according to the requirement information, or (ii) if the total requested energy quantity is greater than the available energy quantity at any given time, the method is carried out again, wherein, in the first step, the central unit generates the information such that it at least partially contains second price information, wherein the second price information is higher than the first price information. Within the meaning of this application, energy is understood to mean, in particular, electric current. An energy consumer is preferably a household appliance, for example a refrigerator, a washing machine, a dishwasher and/or a hairdryer. Alternatively, the energy consumer is a heat pump, a lighting means and/or an electric vehicle. The second price information is preferably virtual, i.e. it exists, in particular, exclusively within the home energy management system and serves only for the distribution of energy and not for actual billing.

The price information preferably entails prices for energy relating to a time period and/or an energy quantity. In particular, the information comprises a plurality of price information elements and/or a plurality of energy quantity information elements. For example, at a specific time, first price information can be allocated to a first energy quantity and second price information can be allocated to a second energy quantity. According to a further example, first price information is allocated to a first time period and second price information is allocated to a second time period. A combination of price information relating to an energy quantity and to a time period is also possible. Price information is, in particular, a price. The method preferably comprises a plurality of energy consumers and/or a plurality of energy sources.

A plurality of options are available to the central unit for defining the second price information. The second price information is preferably determined using empirical values of the central unit. In other words, according to one preferred embodiment, the central unit is provided with a learning capability. As a result, the number of necessary iterations can advantageously be minimized. Particularly preferably, the central unit stores transferred requirement information and/or supply information, in particular over a specific time period. The central unit can thus advantageously make use of stored data, i.e., in particular, first and/or second price information in order to determine, at a specific time and/or for specific energy consumers, second price information which, as closely as possible, approximates final second price information, i.e. a second price, at which the demand no longer exceeds the supply. Alternatively or additionally, the central unit determines the second price information by adding a fixed, in particular gradually or exponentially increasing value to the previous first or second price information.

Compared with the prior art, the method according to aspects of the invention offers the advantage that, in the case of an energy demand at a specific time which exceeds an energy supply at this time, a simple, in particular auction-based, price mechanism comes into play which enables each energy consumer itself to perform a prioritization according to parameters specified for it and independently adapt the energy consumption accordingly. Thus, there is no need to exchange additional information extending beyond price and energy quantities between the central unit and the energy consumer, for example the type or priority of the energy consumer, which advantageously enables a simply structured home energy management system with a simply designed information exchange. The method therefore advantageously enables energy consumers to adapt their operation independently, thus guaranteeing a stable energy supply in the home energy management system.

Unless explicitly indicated otherwise or logically absolutely necessary, the sequence of the individual steps is arbitrary, regardless of their nomenclature. In particular, for example, a ninth step can be performed before or simultaneously with the first step, or vice versa. The first step is preferably provided temporally, in particular at least partially, before the second step, the second step before the third step, the third step before the fourth step, the fourth step before the fifth step and/or the fifth step before the sixth step. In particular, this means that the method according to aspects of the invention can be initiated at any time by any component, i.e. the central unit, any energy consumer and/or any energy source.

According to one preferred embodiment, it is provided that, in a seventh step, the energy source generates supply information containing the maximum energy quantities that can be provided for the predefined time period, wherein, in an eighth step, the energy source transfers the supply information to the central unit, wherein the central unit preferably takes account of the supply information in the first step during the generation of the information and/or in the fifth step during the check, wherein the seventh step and/or the eighth step take place, in particular, before the first step. As a result, it is advantageously possible to incorporate (local) energy sources also into the energy distribution method and, in particular, to enable the energy sources to adapt the energy production depending on the energy demand. The energy source is preferably a photovoltaic system, in particular with a solar inverter.

According to one preferred embodiment, an energy source is at least temporarily an energy consumer. It is thus possible, for example, for an energy source to be a battery which makes energy available on demand, but which stores energy, i.e. operates as an energy consumer, in the event of a very low demand and/or a very high energy supply. Another example is a "smart meter" which sets up a connection to an external energy supply system, for example a power supply network, wherein the external energy supply system is an energy source or an energy consumer depending on supply and demand and the smart meter operates as a central unit. The external energy supply system can, for example, make energy available at a specified price or can absorb energy which, for example, has been generated by a photovoltaic system and is not required. As a result, it is particularly advantageously possible to provide a flexible and dynamic method.

According to one preferred embodiment, it is provided that, in a partial step preceding the first step, the energy consumer transfers a request for the information to the central unit. It is particularly preferably provided that, in a partial step preceding the seventh step, the central unit transfers a request for the supply information to the energy source. As a result, it is advantageously possible for the method according to aspects of the invention to be initiated by any system component, i.e., for example, an energy consumer. An energy consumer can thereby, for example, respond to a change in its situation. An electric vehicle can thus, for example, effect a new distribution if a planned departure time has been postponed.

According to one preferred embodiment, it is provided that the central unit transfers the information and/or at least the second price information to the energy source, wherein the energy source particularly preferably adapts its supply information taking account of the information or the second price information and, quite particularly preferably, transfers the adapted supply information to the central unit. An iterative optimization of the energy distribution is advantageously possible as a result. It is thus advantageously possible for an energy source to stop feeding energy into the home energy management system in the event of an excess supply of energy.

The energy consumer and/or the energy source preferably adapt their operation independently on the basis of the information transferred from the central unit, in particular on the basis of the transferred price information. It is particularly preferably provided that the energy consumer reduces or increases its energy consumption, in particular switches itself on or off. The same applies accordingly to the energy source, which adapts its operation preferably depending on the price, in particular switches itself on or off or regulates energy production. As a result, it is advantageously possible for the energy consumer and/or the energy source to regulate their operation independently on the basis of information accessible to them alone.

The adaptations are quite particularly preferably carried out depending on specified prioritizations and/or parameters. It is thus possible, for example, for an energy consumer to absorb or require at least enough energy to maintain a minimum operation. Alternatively and optionally, it is provided that an energy consumer has a specific maximum and/or minimum price at which it is intended to obtain energy. The same applies accordingly to an energy source. For example, a consumer can specify to an electric vehicle that it has a different energy absorption behavior depending on its state of charge. It is thus possible that an electric vehicle is intended to absorb energy beyond a predefined state of charge only if the price falls below a specific limit value, and/or that the electric vehicle is intended to absorb energy at any price in the case of a different predefined state of charge in order to guarantee a minimum functionality.

According to one preferred embodiment, it is provided that the information, the requirement information and/or the supply information contain exclusively at least one price information element and/or at least one energy quantity information element for the predefined time period. The information, the requirement information and/or the supply information particularly preferably contain a plurality of price information elements and/or a plurality of energy quantity information elements. As a result, it is advantageously possible for the distribution method according to aspects of the invention to be applied to complex energy prices also.

According to one preferred embodiment, it is provided that, in a ninth step preceding the first and/or third step, the energy consumer determines the energy quantity to be requested on which the requirement information is based. As a result, it is advantageously possible for the energy consumer initially to determine the energy quantity currently required and/or required over a specific time period before it submits a request to the central unit.

According to one preferred embodiment, it is provided that the communication, i.e. the information exchange or data exchange, between the central unit and the energy consumer and/or the energy source is performed in a wired or wireless manner, particularly preferably via an Internet-protocol-based method and/or a bus system, in particular a CAN bus. The communication takes place quite particularly preferably via a public and/or private network and/or via the Internet. In particular, the communication takes place according to the ISO 15118 standard. It is important, in particular, that the information exchange or data exchange is provided in such a way that information relating to the available energy quantity, the required energy quantity and price information can be exchanged.

According to one preferred embodiment, it is provided that the system also comprises energy consumers and/or energy sources which are not capable of exchanging data with the central unit. In this case, it is particularly preferably provided that the central unit measures the required energy quantity of the energy consumer and/or the provided energy quantity of the energy source and, in particular, produces requirement information or supply information. As a result, it is particularly advantageously possible to also integrate older energy consumers or energy sources into the system and take them into account in the energy distribution method.

The person skilled in the art will understand that the central unit distributes the energy quantity for an energy consumer and/or energy source of this type on the basis of predefined criteria, since they cannot actively participate in the method. To do this, the central unit preferably makes use of the methods explained above and known from the prior art.

A further subject-matter of the present invention is a home energy management system, comprising a central unit, at least one energy source and at least one energy consumer, wherein the central unit, the energy source and the energy consumer are interconnected to exchange information, wherein the home energy management system is configured to carry out a method according to aspects of the invention.

As a result, it is advantageously possible to provide a compact home energy management system in which the central unit does not need to be provided with any further information relating to the energy consumers, as a result of which the central unit can advantageously be simply designed and is particularly compatible with a multiplicity of energy consumers. As a result, the home energy management system according to aspects of the invention can particularly advantageously be designed as simple and compact and can be implemented accordingly at low cost. A plurality of home automation systems can particularly preferably be provided in a linked, for example cascaded, manner, wherein one energy consumer is then, in particular, a further central unit of a further home automation system.

According to one preferred embodiment, it is provided that the home energy management system comprises a device, wherein the device comprises the central unit, the energy source and/or the energy consumer. The device is particularly preferably a household charging unit, in particular for an electric vehicle. As a result, it is advantageously possible to provide a home energy management system which has a particularly compact design.

A further subject-matter of the present invention is a computer program, comprising a machine-readable program code, wherein the program code, if it is executed on a home energy management system, in particular a central unit, an energy source and/or an energy consumer, causes the home energy management system, in particular the central unit, the energy source and/or the energy consumer, to carry out a method according to aspects of the invention.

A further subject-matter of the present invention is a computer program product for distributing energy in a home energy management system, wherein the computer program product has a computer program which is provided on a storage medium, wherein the computer program comprises a machine-readable program code, wherein the program code, if it is executed on a home energy management system, in particular a central unit, an energy source and/or an energy consumer, causes the home energy management system, in particular the central unit, the energy source and/or the energy consumer, to carry out a method according to aspects of the invention.

In respect of possible advantageous embodiments, reference is made to the explanations given in respect of the method according to aspects of the invention, which similarly apply to this subject-matter, and vice versa.

BRIEF DESCRIPTION OF THE DRAWING

Further details, features and advantages of the invention can be found in the drawings, and also in the following description of preferred embodiments with reference to the drawings. The drawings merely illustrate example embodiments of the invention which do not restrict the essential inventive concept.

DETAILED DESCRIPTION OF THE INVENTION

Figure 1:
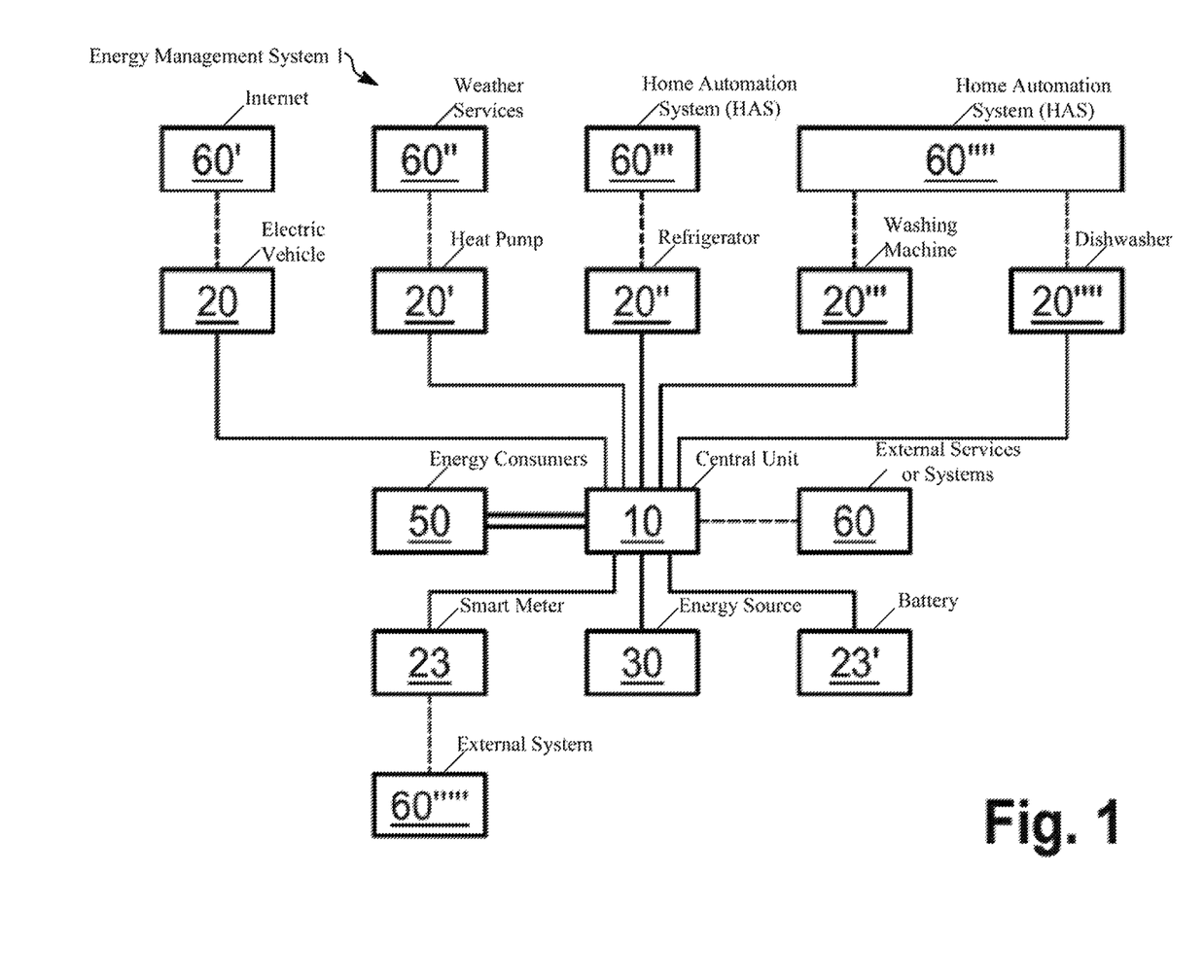
FIG. 1 shows a home energy management system according to one example embodiment of the present invention.

FIG. 1 shows a home energy management system 1 according to one example embodiment of the present invention. The home energy management system 1 comprises a central unit 10 which is connected to at least one energy consumer 20. The connection is established via wired or wireless communication according to an Internet-protocol-based method or a bus system, here, by way of example, via an intranet. A communication of this type is indicated according to the present representation by continuous lines.

The energy consumer 20 is e.g. an electric vehicle. Here, the home energy management system comprises further energy consumers 20', 20", 20''' and 20''''. These may, for example, be a heat pump 20', a refrigerator 20", a washing machine 20''' and a dishwasher 20''''.

These energy consumers 20-20'''' are in turn connected to external services or systems 60-60'''', wherein the washing machine 20''' and the dishwasher 20'''' are jointly connected to an external system 60'''', here a home automation system (HAS). In order to make it clear that these systems do not form part of the home energy management system per se, the corresponding connections are indicated by broken lines. The electric vehicle 20 is, for example, connected via on-board systems to the Internet 60', the heat pump 20' to weather services 60", and the refrigerator to a further HAS 60'''.

The home energy management system 1 furthermore comprises an energy source 30, here a photovoltaic system with a solar inverter, which can feed energy in the form of electric current into the system.

It is also possible for the home energy management system 1 to comprise units which can operate as an energy source 30 or an energy consumer 20 according to the situation. In this sense, combined energy consumers or energy sources 23 are therefore involved. Here, this may be a battery 23' which feeds energy into the system or stores energy depending on the energy supply situation. In the present case, a smart meter 23 is furthermore provided which is connected to an external energy management system 60''''', for example a municipal power grid. The smart meter 23 feeds energy from the photovoltaic system into the external energy management system 60''''' and, on the other hand, supplies the home energy management system 1 with energy from this external system 60'''''.

The central unit 10 may itself similarly be connected to external systems or services 60. It can thus, for example, be supplied by external systems 60 of this type with information relating to an available energy quantity and the associated price information.

Further energy sources or energy consumers 50 are furthermore connected here to the central unit 10. However, these are not capable of IP-based communication, which is indicated by the double broken lines. In order to incorporate these energy consumers or sources also into the system 1 according to aspects of the invention or the method according to aspects of the invention, the central unit measures the energy absorption or output thereof and proceeds according to the determined measured values, wherein it allocates energy quantities for these systems 50 on the basis of specified prioritization criteria. Alternatively, it is conceivable for the further energy sources or energy consumers 50 to be connected to an energy consumer 20 or an energy source 30, as a result of which the central unit is connected indirectly to the further energy sources or energy consumers with which it communicates as described above.

Figure 2:
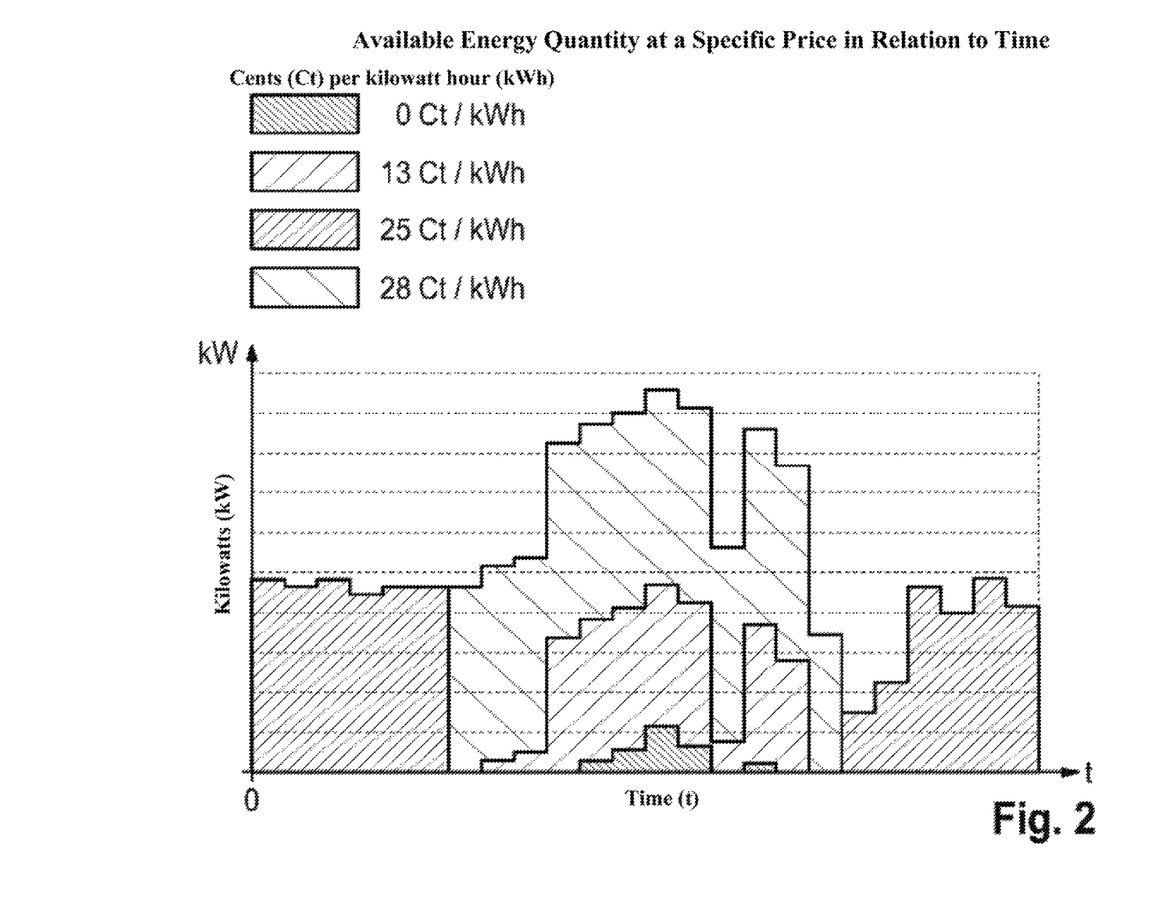
FIG. 2 shows a graphical representation of information according to one example embodiment of the present invention.

FIG. 2 shows a graphical representation of information according to one example embodiment of the present invention. This is appropriately plotted here as a graph of an available energy quantity in kW against time, wherein different prices are represented by different areas. The indicated prices in cents per kWh are to be understood purely by way of example.

It is immediately clear that there is a period of time in the middle in which a lot of energy is available at high prices and very little energy at low prices. An essentially constant energy quantity is available at average prices outside these times. A graph of this type may relate, in particular, to a specific energy source 30.

In the course of the method according to aspects of the invention, the central unit 10 determines information for the entire home energy management system 1, wherein this information can be represented in a form resembling the present representation, thereby indicating the total available energy at specific prices over time.

Here, the information thus comprises an available energy quantity at a specific price in relation to time. Additional information, such as, for example, the source of a specific energy quantity, a $CO_2$ emission associated with the energy quantity or a proportion of renewable energies in an energy quantity may similarly be included, but are not necessary and are also preferably not included. The person skilled in the art will understand that the integral above the graphs indicates the total available energy quantity.

Figure 3:
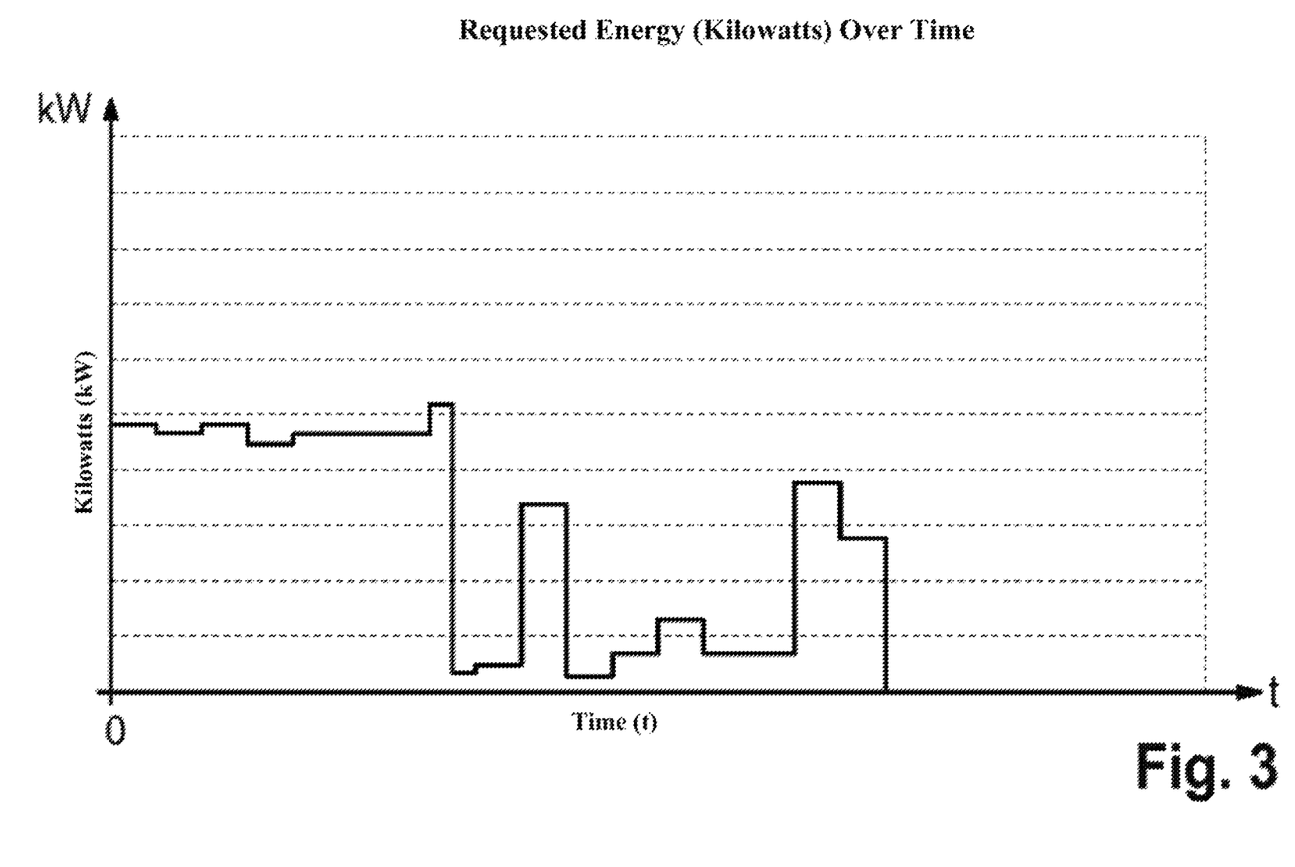
FIG. 3 shows a graphical representation of requirement information according to one example embodiment of the present invention.

FIG. 3 shows a graphical representation of requirement information according to one example embodiment of the present invention. The requested energy quantity is plotted in kW over time. In the present example, the associated energy consumer 20 requires an essentially constant energy quantity at the outset which decreases over time. Towards the end of the represented time period, the energy consumer 20 requires no further energy whatsoever.

Figure 4:
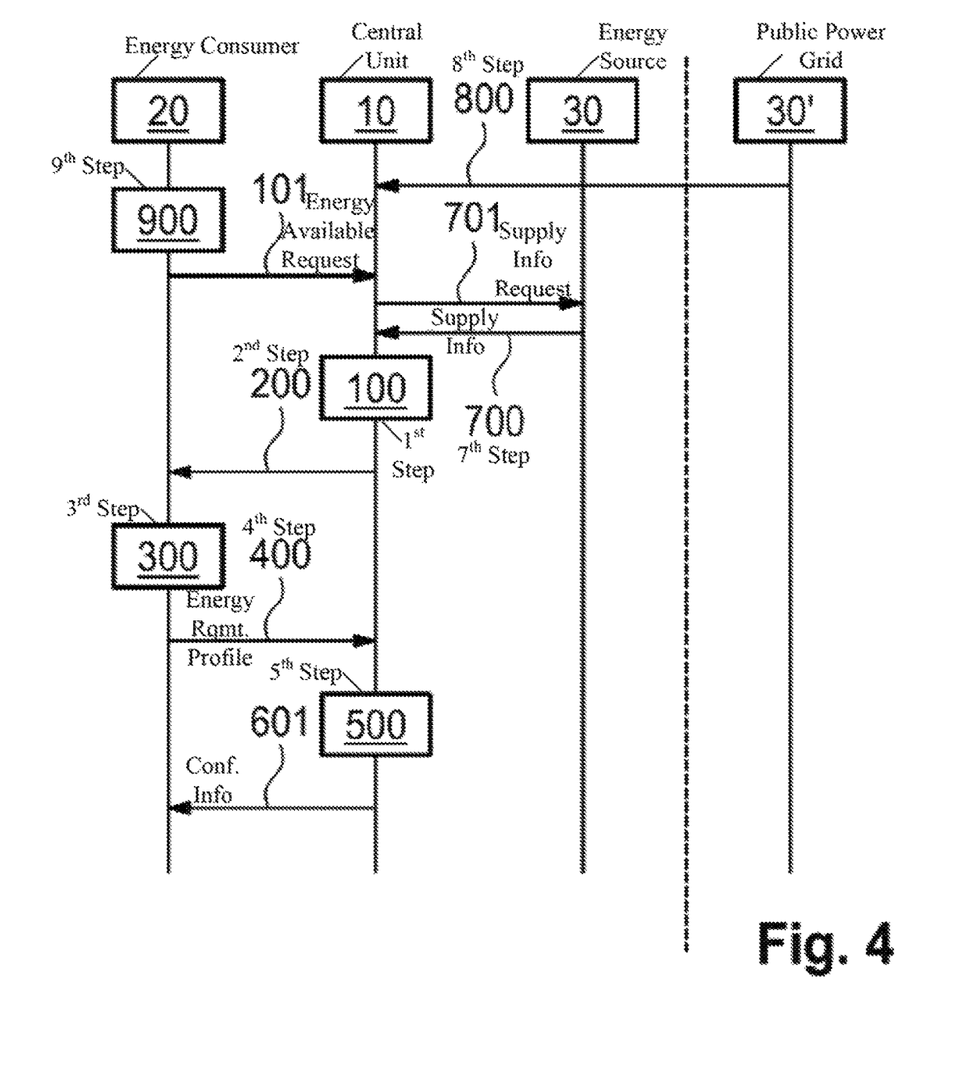
FIG. 4 shows a method according to one example embodiment of the present invention.

FIG. 4 shows a method according to one example embodiment of the present invention. The method begins here in that an energy source 30', for example a public power grid, in an eighth step 800, informs a central unit 10 of the home energy management system 1 of the available energy quantities at specific prices for a specific period.

In a ninth step 900, which can be carried out before, after or in parallel with the eighth step 800, an energy consumer 20 of the home energy management system 1 defines the power required by it, in particular for a predefined time period. It then submits a request 101 to the central unit 10 of the home energy management system 1 for information relating to the energy available in relation to the price and the predefined time period.

In a seventh step 700, the central unit 10 then submits a request 701 to an energy source 30 located in the home energy management system 1 in order to obtain supply information which, similar to the information, comprises a provided, price-coded energy quantity for the predefined time period. The energy source 30 determines this supply information in the seventh step 700 and transfers it to the central unit 10.

In a first step 100, the central unit 10 then determines the information comprising price-coded, available energy quantities in the predefined time period.

In a second step 200, the central unit 10 then transfers this information to the energy consumer 20. In a third step 300, said energy consumer, taking account of the information provided by the central unit 10 and the determined required energy, determines requirement information which, similar to the supply information or the information for the predefined time period, comprises energy quantities requested or to be requested at a specific price.

In a fourth step 400, the energy consumer 20 transfers the requirement information, which can also be referred to as the energy requirement profile, to the central unit 10.

In a fifth step 500, the central unit 10 then checks, on the basis of the transferred requirement information and taking account of the transferred supply information whether, at any given time, the total requested energy quantity exceeds the energy quantity available at this time. In the present case, this condition is not met, since there is only one energy consumer 20 whose requirement information has in fact been determined taking account of the available energy quantity.

In this case, the central unit 10 will therefore transfer confirmation information to the energy consumer 20 in a sixth step 601, indicating to the energy consumer 20 that the required energy quantity is available. This is to be regarded as equivalent to the central unit 10 transferring consent in respect of the requirement information to the energy consumer 20. In any event, it is crucial that the energy consumer 20 then absorbs energy from the home energy management system 1 according to its requirement information.

According to one embodiment which is not shown, the home energy management system 1 comprises a plurality of energy consumers 20-20''''. In this case, it may occur, particularly at peak times when many energy consumers 20-20'''' require large quantities of energy, that the check in the fifth step 500 reveals that, at one time at least, the total requested energy quantity exceeds the energy quantity available at this time. In this case, the method according to aspects of the invention is then carried out iteratively, but wherein the central unit at least partially replaces the first price information on which the information is based with a second, higher price information. An auction mechanism is thereby introduced to some extent, since each energy consumer 20 must then decide once more whether it retains its originally requested energy quantities also taking account of the higher (virtual) second price information or, for example, requests smaller energy quantities. The decision as to whether a higher price is acceptable to an energy consumer 20 is thus made entirely by the latter and may depend on different parameters. A prioritization system may thus be specified for an energy consumer 20', or an energy consumer 20''' restricts its energy absorption at times with a high price.

It is clear that the second price does not have to apply to the entire predefined time period, but may well do so. It is thus possible, for example, that the energy demand exceeds the energy supply only at peak times and that second price information in the sense of a higher virtual price is applied at these times only.

It is similarly possible within the scope of the method according to aspects of the invention that the energy source 30 also responds to the price change and, for example, supplies larger energy quantities and adapts the supply information accordingly.

The steps may also partially vary or be omitted, depending on the design of the home energy management system 1 and the situation.

What is claimed is:

1. A method for distributing energy in a home energy management system comprising a central unit, a plurality of energy sources and a plurality of energy consumers, wherein the central unit, the plurality of energy sources and the plurality of energy consumers are interconnected to exchange information, the method comprising:
   in a first step, the central unit of the home energy management system generates energy time-coded price information from each of the plurality of energy sources containing both:
      (i) a first energy time-coded price information element including a first price-coded enemy quantity of a first available enemy quantity at a first specified price for a first predefined time period from the plurality of energy sources; and
      (ii) a second enemy time-coded price information element including a second price-coded energy quantity of a second available energy quantity at a second specified price for a second predefined time period from the plurality of energy sources;
   in a second step, the central unit transfers the energy time-coded price information to the plurality of energy consumers of the home energy management system, the plurality of energy consumers comprising at least two of an electric vehicle, a heat pump, a lighting system, or a home appliance;
   in a third step, each of the plurality of energy consumers, taking account of the enemy time-coded price information containing both the first energy time-coded price information element and the second energy time-coded price information element, determines a respective energy requirement information containing a respective first requested energy quantity for the first predefined time period and a respective second requested enemy quantity for the second predefined time period,
   in a fourth step, each of the energy consumers transfers the respective energy requirement information to the central unit,
   in a fifth step, the central unit checks whether, during both the first predefined time period and the second predefined time period:
      (i) a first total requested energy quantity determined from the transferred respective first requested energy quantity from each the plurality of energy consumers exceeds a first energy quantity available from all of the energy sources during the first predefined time period; and
      (ii) second total requested energy quantity determined from the transferred respective second requested energy quantity from each of the plurality of energy consumers exceeds a second energy quantity available from all of the energy sources during the second predefined time period,
   in a sixth step:
      (i) if the first total requested energy quantity is determined in the fifth step to be less than or equal to the first energy quantity available during the first predefined time period:

the central unit transfers a respective energy confirmation information to each of the energy consumers, wherein the respective energy confirmation information indicates that respective first requested energy quantity is available during the first predefined time period; and the plurality of energy consumers absorb the respective first requested energy quantity for the first predefined time period, and (ii) if the second total requested energy quantity is determined in the fifth step to be greater than the second energy quantity available during the second time period the method is carried out again, wherein, in the first step, the central unit generates the second energy time-coded price information element including the second price-coded energy quantity of the second available energy quantity in such a way that the second specified price for the second predefined time period is higher and is used exclusively within the home energy management system.

2. The method as claimed in claim 1, wherein, in a seventh step, each of the energy sources generates a respective energy supply information containing a first maximum energy quantity that can be provided for the first predefined time period and a second maximum enemy quantity that can be provided for the second predefined time period, wherein, in an eighth step, the energy source transfers the respective energy supply information to the central unit, wherein the central unit takes account of the respective energy supply information in the first step during the generation of the enemy time-coded price information and in the fifth step during the check of the first total requested energy quantity and the second total requested energy quantity, wherein the seventh step or the eighth step take place before the first step.

3. The method as claimed in claim 2, wherein, in a step preceding the first step, each of the energy consumers transfers a request for the enemy time-coded price information to the central unit.

4. The method as claimed in claim 2, wherein, in a step preceding the seventh step, the central unit transfers a request for the respective energy supply information to each of the energy sources.

5. The method as claimed in claim 1, wherein each of the energy consumers, in a ninth step preceding the first or third step, determines the respective energy requirement information.

6. The home energy management system as claimed in claim 1, wherein the home energy management system comprises a device, wherein the device comprises one or more of the central unit, the energy source, and the energy consumer.

7. A computer program comprising a machine-readable program code, wherein the program code, when executed on the home energy management system, causes the home energy management system to carry out the method as claimed in claim 1.

8. A computer program product for distributing energy in the home energy management system, wherein the computer program product has a computer program which is provided on a non-transitory storage medium, wherein the computer program comprises a machine-readable program code, wherein the program code, when executed on the home energy management system, causes the home energy management system to carry out the method as claimed in claim 1.

* * * * *